US008379516B2

(12) United States Patent
Barkai et al.

(10) Patent No.: US 8,379,516 B2
(45) Date of Patent: Feb. 19, 2013

(54) GRID ROUTING APPARATUS AND METHOD

(75) Inventors: Sharon Barkai, Los Altos, CA (US);
Ariel Noy, Herzlia (IL); Gideon Kaempfer, RaAnana (IL); Ron Sidi, Bat-Yam (IL)

(73) Assignee: ConteXtream Ltd., Petach-Tikva (IL)

( * ) Notice: Subject to any disclaimer, the term of this patent is extended or adjusted under 35 U.S.C. 154(b) by 452 days.

(21) Appl. No.: 12/647,145

(22) Filed: Dec. 24, 2009

(65) Prior Publication Data

US 2011/0158082 A1   Jun. 30, 2011

(51) Int. Cl.
*H04J 1/16* (2006.01)

(52) U.S. Cl. .................. 370/229; 370/230; 370/235

(58) Field of Classification Search .................. 370/216, 370/218, 229, 230, 231, 235, 254, 252, 389, 370/392, 395.31, 258, 390, 328, 422, 419, 370/400, 401; 709/236, 230, 223, 226, 224
See application file for complete search history.

(56) References Cited

U.S. PATENT DOCUMENTS

| | | | |
|---|---|---|---|
| 5,640,399 A | 6/1997 | Rostoker et al. | |
| 6,216,173 B1 | 4/2001 | Jones et al. | |
| 6,452,915 B1 | 9/2002 | Jorgensen | |
| 6,603,738 B1 | 8/2003 | Kari et al. | |
| 6,687,247 B1 | 2/2004 | Wilford et al. | |
| 6,959,335 B1 | 10/2005 | Hayball et al. | |
| 7,013,084 B2 | 3/2006 | Battou et al. | |
| 7,075,919 B1 | 7/2006 | Wendt et al. | |
| 7,190,696 B1 | 3/2007 | Manur et al. | |
| 7,327,748 B2 | 2/2008 | Montalvo et al. | |
| 7,835,357 B2 * | 11/2010 | Panwar et al. | 370/389 |
| 2002/0031135 A1 | 3/2002 | Inoue | |
| 2002/0036984 A1 | 3/2002 | Chiussi et al. | |
| 2002/0049901 A1 | 4/2002 | Carvey | |
| 2003/0046336 A1 | 3/2003 | D'Annunzio et al. | |
| 2003/0058878 A1 | 3/2003 | Minnick et al. | |
| 2003/0061296 A1 | 3/2003 | Craddock et al. | |
| 2003/0093463 A1 | 5/2003 | Graf | |
| 2003/0123449 A1 | 7/2003 | Kuhl et al. | |
| 2003/0149773 A1 | 8/2003 | Harbin et al. | |
| 2003/0161303 A1 | 8/2003 | Mehrvar | |
| 2003/0198241 A1 | 10/2003 | Putcha et al. | |

(Continued)

FOREIGN PATENT DOCUMENTS

| | | |
|---|---|---|
| EP | 1345366 | 9/2003 |
| EP | 1418715 | 5/2004 |

(Continued)

OTHER PUBLICATIONS

Bitar "Applicability of Access Node Control Mechanism to PON Based Broadband Networks", known as draft-bitar-wadhwa-ancp-pon-01.

(Continued)

*Primary Examiner* — Abdullah Riyami

(57) ABSTRACT

A grid router for routing packets and a network containing the same. The router comprises ingress units (IE), mailbox units (MU), and egress units (EU) connected in a structure of succeeding layers, said layered structure being segregated such that units in a given layer are connected only to a subset of units in a succeeding layer, wherein said grid router comprises a hashing unit for using a hashing function to direct incoming packets through said layers, and wherein said hashing function is configured to reinforce said segregation by directing packets arriving at a given unit in one layer only to units of a corresponding subset in said succeeding layer.

23 Claims, 4 Drawing Sheets

U.S. PATENT DOCUMENTS

| | | | |
|---|---|---|---|
| 2003/0214954 A1 | 11/2003 | Oldak et al. | |
| 2004/0001499 A1 | 1/2004 | Patella et al. | |
| 2004/0042448 A1 | 3/2004 | Lebizay et al. | |
| 2004/0071164 A1 | 4/2004 | Baum | |
| 2004/0120261 A1 | 6/2004 | Ovadia et al. | |
| 2004/0163084 A1 | 8/2004 | Devadas et al. | |
| 2004/0223497 A1 | 11/2004 | Sanderson et al. | |
| 2004/0233845 A1 | 11/2004 | Jeong et al. | |
| 2005/0025051 A1* | 2/2005 | Roeder | 370/230 |
| 2005/0063392 A1 | 3/2005 | Ofuji et al. | |
| 2005/0141426 A1 | 6/2005 | Hou | |
| 2005/0175014 A1 | 8/2005 | Patrick | |
| 2005/0210479 A1 | 9/2005 | Andjelic | |
| 2005/0226216 A1 | 10/2005 | Oyama et al. | |
| 2006/0007935 A1 | 1/2006 | Bennett et al. | |
| 2006/0034239 A1 | 2/2006 | Abeta et al. | |
| 2006/0129676 A1 | 6/2006 | Modi et al. | |
| 2006/0159078 A1 | 7/2006 | Konda | |
| 2006/0251109 A1 | 11/2006 | Muller et al. | |
| 2007/0058548 A1 | 3/2007 | Babonneau et al. | |
| 2007/0121499 A1 | 5/2007 | Pal et al. | |
| 2007/0153697 A1 | 7/2007 | Kwan et al. | |
| 2007/0165529 A1 | 7/2007 | Nakamura et al. | |
| 2007/0280245 A1 | 12/2007 | Rosberg | |
| 2007/0280277 A1 | 12/2007 | Lund | |
| 2008/0025290 A1* | 1/2008 | Barkai | 370/352 |
| 2008/0198867 A1* | 8/2008 | Moll et al. | 370/419 |
| 2008/0212472 A1 | 9/2008 | Musacchio et al. | |
| 2008/0240154 A1 | 10/2008 | Oved | |
| 2008/0259798 A1 | 10/2008 | Loh et al. | |
| 2008/0259936 A1 | 10/2008 | Hussain et al. | |
| 2009/0109968 A1* | 4/2009 | Noy et al. | 370/389 |
| 2009/0122702 A1 | 5/2009 | Chew et al. | |
| 2010/0017535 A1 | 1/2010 | Aloni et al. | |
| 2010/0046368 A1* | 2/2010 | Kaempfer et al. | 370/231 |
| 2010/0054117 A1* | 3/2010 | Southworth et al. | 370/216 |
| 2010/0118728 A1* | 5/2010 | Prudent | 370/252 |
| 2010/0202295 A1 | 8/2010 | Smith et al. | |
| 2010/0214913 A1* | 8/2010 | Kompella | 370/230 |
| 2011/0110373 A1* | 5/2011 | Ghosh et al. | 370/392 |

FOREIGN PATENT DOCUMENTS

| | | |
|---|---|---|
| WO | WO 2008/129790 | 10/2008 |
| WO | WO 2009/057109 | 5/2009 |
| WO | WO 2010/020988 | 2/2010 |

OTHER PUBLICATIONS

Response Dated Nov. 28, 2011 to Official Action of Jul. 28, 2011 From the US Patent and Trademark Office Re.: U.S. Appl. No. 11/615,977.
Supplementary European Search Report and the European Search Opinion Dated Oct. 26, 2010 From the European Patent Office Re. Application No. 08845163.8.
Bianco et al. "Multistage Switching Architectures for Software Routers", IEEE Network, XP011188056, 21(4): 15-21, Jul. 1, 2007. p. 18, 1-H col., Line 19-p. 21, 1-h col., Line 34, Fig.4.
International Search Report Dated Mar. 9, 2009 From the International Searching Authority Re.: Application No. PCT/IL2008/001424.
Written Opinion Dated Mar. 9, 2009 From the International Searching Authority Re.: Application No. PCT/IL2008/001424.
Official Action Dated Oct. 24, 2011 From the US Patent and Trademark Office Re.: U.S. Appl. No. 11/927,861.
Response Dated Jan. 10, 2011 to Official Action of Oct. 12, 2010 From the US Patent and Trademark Office Re.: U.S. Appl. No. 12/195,490.
Official Action Dated Jan. 10, 2011 From the US Patent and Trademark Office Re.: U.S. Appl. No. 11/615,977.
Official Action Dated Jan. 31, 2012 From the US Patent and Trademark Office Re.: U.S. Appl. No. 11/615,977.
International Preliminary Report on Patentability Dated Mar. 3, 2011 From the International Bureau of WIPO Re.: Application No. PCT/IL2009/000810.
International Preliminary Report on Patentability Dated Mar. 6, 2012 From the International Preliminary Examining Authority Re. Application No. PCT/IL2010/001074.
International Search Report and the Written Opinion Dated Apr. 6, 2011 From the International Searching Authority Re. Application No. PCT/IL2010/001074.
Response Dated Apr. 11, 2011 to Official Action of Jan. 10, 2011 From the US Patent and Trademark Office Re.: U.S. Appl. No. 11/615,977.
Official Action Dated Oct. 7, 2010 From the US Patent and Trademark Office Re.: U.S. Appl. No. 11/927,861.
Official Action Dated Oct. 12, 2010 From the US Patent and Trademark Office Re.: U.S. Appl. No. 12/195,490.
Response Dated Oct. 21, 2010 to Official Action of Aug. 4, 2010 From the US Patent and Trademark Office Re.: U.S. Appl. No. 11/615,977.
Official Action Dated Jul. 28, 2011 From the US Patent and Trademark Office Re.: U.S. Appl. No. 11/615,977.
Official Action Dated Aug. 4, 2010 From the US Patent and Trademark Office Re.: U.S. Appl. No. 11/615,977.
Supplementary European Search Report and the European Search Opinion Dated May 31, 2010 From the European Patent Office Re. Application No. 06821659.7.
Response Dated Jun. 15, 2011 to Official Action of Mar. 15, 2011 From the US Patent and Trademark Office Re.: U.S. Appl. No. 12/195,490.
Response Dated Jul. 22, 2010 to Official Action of Apr. 23, 2010 From the US Patent and Trademark Office Re.: U.S. Appl. No. 11/927,861.
Communication Pursuant to Rule 70(2) and 70a(2) EPC Dated Jun. 17, 2010 From European Patent Office Re. Application No. 06821659.7.
Response Dated Aug. 10, 2011 to Official Action of May 10, 2011 From the US Patent and Trademark Office Re.: U.S. Appl. No. 11/927,861.
Response Dated Sep. 27, 2011 to International Search Report and the Written Opinion of Apr. 6, 2011 From the International Searching Authority Re. Application No. PCT/IL2010/001074.
Official Action Dated May 10, 2011 From the US Patent and Trademark Office Re.: U.S. Appl. No. 11/927,861.
International Preliminary Report on Patentability Dated May 14, 2010 From the International Bureau of WIPO Re. Application No. PCT/IL2008/001424.
Official Action Dated Mar. 15, 2011 From the US Patent and Trademark Office Re.: U.S. Appl. No. 12/195,490.
Response Dated Apr. 19, 2010 to Official Action of Jan. 19, 2010 From the US Patent and Trademark Office Re.: U.S. Appl. No. 11/615,977.
Official Action Dated Apr. 23, 2010 From the US Patent and Trademark Office Re.: U.S. Appl. No. 11/927,861.
Communication Relating to the Results of the International Search Dated Nov. 20, 2009 From the International Searching Authority Re.: Application No. PCT/IL2009/000810.
International Search Report and the Written Opinion Dated Mar. 10, 2010 From the International Searching Authority Re.: Application No. PCT/IL2009/000810.
International Search Report Dated Nov. 2, 2007 From the International Searching Authority Re.: Application No. PCT/IL06/01476.
Official Action Dated May 11, 2009 From the US Patent and Trademark Office Re.: U.S. Appl. No. 11/615,977.
Official Action Dated Jan. 19, 2010 From the US Patent and Trademark Office Re.: U.S. Appl. No. 11/615,977.
Written Opinion Dated Nov. 2, 2007 From the International Searching Authority Re.: Application No. PCT/IL06/01476.
Response Dated Jan. 6, 2011 to Official Action of Oct. 7, 2010 From the US Patent and Trademark Office Re.: U.S. Appl. No. 11/927,861.
Official Action Dated Jul. 30, 2012 From the US Patent and Trademark Office Re. U.S. Appl. No. 12/195,490.
Communication Under Rule 71(3) EPC Dated Dec. 6, 2012 From the European Patent Office Re. Application No. 08845163.8.
Official Action Dated Dec. 12, 2012 From the US Patent and Trademark Office Re.: U.S. Appl. No. 12/195,490.

* cited by examiner

GRID ROUTING APPARATUS AND METHOD

FIELD AND BACKGROUND OF THE INVENTION

The present invention relates to a device and method for grid routing and, more particularly, but not exclusively to grid routing on a segregated network.

U.S. patent application Ser. Nos. 11/615,977, 11/927,861 and 12/195,490 all assigned to ConteXtream, the contents of which are hereby incorporated by reference, teach a Grid Router as a distributed system consisting of three types of building blocks termed "Ingress Unit" (IU), "Egress Unit" (EU) and "Mailbox Unit" (MU) connected together via a transport network providing Clos like connectivity such that each IU is connected to each MU and each MU is connected to each EU. Clos-like networks are multi-stage switching networks. IU's and EU's are normally paired to form a single united "Ingress-Egress Unit" (IEU, also termed External Interface Unit—EIU), such that the above described topology can be described simply as a topology where each IEU is connected to each MU.

As described in the art, forwarding of traffic from IEU's to MU's is based on a hash function applied to packet headers and information derived from them resulting in the selection of a target MU normally selected uniformly among the set of MU's. Uniform selection assumes random packet headers or a wide variety of packet headers.

U.S. patent application Ser. No. 11/615,977, "Distributed Edge Network" by Barkai et al teaches, for each incoming data packet, each external interface unit may determine which mailbox unit may manage the mailbox for the service being transmitted by the data packet. Each external interface unit may perform a hashing function on at least some of the information in a header of the data packet. The resultant hash value may be the mailbox number within edge network for the service carried by the data packet. With the mailbox number, the external interface unit may directly write (typically using remote DMA (rDMA)) the data packet to the indicated mailbox.

The hashing functions performed by external interface units may be of any suitable sort, depending on the size of the network and the information available in the incoming data packets. In one embodiment, the hashing function may be a function of the source and/or destination addresses and a broadcast bit also found in the headers of data packets. In this embodiment, if the service is a point-to-multipoint service, as indicated by the broadcast bit, the mailbox for the service may be placed close to the source of the data and thus, the hashing may be performed on the source address. If the service is a multipoint-to-multipoint service, as indicated by the broadcast bit, the mailbox for the service may be placed anywhere and thus, the hashing may be performed on a combination of the source and destination addresses. If the service is a point-to-point service, the hashing may be performed on the source address or on the destination address, as desired. An exemplary hashing function may be "modulo 1000".

In accordance with a preferred embodiment, administrative domains may be defined over the edge network of the present invention. Each domain may belong to a different vendor and may have its own table of services and its own hashing function but all the domains may utilize the same edge network. As described hereinabove, each domain allows plug and play access connections for devices and for data and media centers. Each device and/or center is added merely by adding the services they offer into the table of services. Moreover, each domain may route traffic anywhere in the metropolitan area, per subscriber per service.

U.S. patent application Ser. No. 11/927,861, "Grid Router" by Barkai et al. teaches that the hasher may review the headers stored in the storage area, taking each one in turn. The hasher may read each header, and may generate a hash value H.sub.1 from the data stored therein. The hash value H.sub.1 may indicate into which mailbox unit to transfer the packet. As discussed in U.S. patent application Ser. No. 11/615,977, the hash input may vary depending on the type of service carried by the packet. Typically, the packet may include an indication of the type of service carried therein.

In many networks, the connectivity between all IEU's and all MU's can be guaranteed, and the grid routers referred to above use uniform hashing functions which require such full connectivity. Grid routers with uniform hashing functions provide a scalable solution to network connectivity.

However, in a large class of networks, such as multi-service telecom access networks or cellular access networks the connectivity between these units is frequently more limited. In these cases, due to physical partitioning of the underlying transport network, an IEU may have connectivity to strictly defined subsets of MU's. We refer to such networks as segregated networks. The prior art grid routers cannot be used on such networks, which are left with non-scalable solutions.

SUMMARY OF THE INVENTION

The present embodiments provide a technique for applying Grid Routers to segregated networks, thus allowing a scalable solution. A grid router solution may also reduce the processing and network overheads related to such networks while ensuring Quality of Service, high availability and other desirable characteristics of the Grid Router.

According to one aspect of the present invention there is provided a grid router for routing packets, the router comprising ingress units (IE), mailbox units (MU), and egress units (EU) connected in a structure of succeeding layers, the layered structure being segregated such that units in a given layer are connected only to a subset of units in a succeeding layer, the subset being an incomplete subset of the succeeding layer, wherein the grid router comprises a hashing unit for using a hashing function to direct incoming packets through the layers, and wherein the hashing function is configured to reinforce the segregation by directing packets arriving at a given unit in one layer only to units of a corresponding subset in the succeeding layer.

In an embodiment, the hashing function is a uniform function pointing to location tables, the location tables being specific to respective subsets.

In an embodiment, the hashing function comprises a plurality of hashing sub-functions, each sub-function being specific to a given subset.

In an embodiment, the hashing sub-functions are variants of a single hash function.

In an embodiment, the hashing function is a single hash function and is fed a key that is offset by an identifier implying a given subset.

In an embodiment, the hashing function comprises grouped sub-functions, each grouped sub-function being set with a bias for a physically closest unit of a respective subset.

In an embodiment, for multicast traffic, selection of a subset comprises forwarding to an MU collocated with the IU receiving the multicast traffic.

In an embodiment, for traffic flowing upstream towards an application service source, selection of a subset comprises forwarding the traffic to an MU collocated with the destination EU of the traffic.

In an embodiment, for traffic flowing downstream from an application service source, selection of a subset comprises forwarding the traffic to an MU collocated with the source IU of the traffic.

In an embodiment, for traffic requiring multi-hop forwarding, selection of a subset comprises forwarding the traffic to an MU collocated with the source IU of the traffic, the collocated MU further being configurable to forward the traffic to a next one of the multi-hops.

In an embodiment, external units are respectively connected via an aggregated link to a first and at least a second access point of the grid router, wherein the grid router is constructed such that notification of a failure of a unit in one layer of the grid router is passed on to a corresponding access point, thereby allowing traffic from a given external unit to be rerouted to at least one second access point via the aggregated link, thereby to avoid the failure.

In an embodiment, the access points are ingress units, the unit in one layer to which the failure notification relates is a mail unit, and the notification of failure causes shutting down of the corresponding access point. The traffic is then redirected to another ingress unit sharing the same aggregated link.

In an embodiment, packets are hashed to a primary and a secondary member of a pair of parallel units, such that in the event of failure of the primary member, a respective packet is routed to the secondary member, thereby avoiding the failure.

According to a second aspect of the present invention, there is provided a network comprising grid routers for routing packets, the grid routers comprising ingress units (IE), mailbox units (MU), and egress units (EU) connected in a structure of succeeding layers, the layered structure being segregated such that units in a given layer are connected only to a subset of units in a succeeding layer, the subset being an incomplete subset of units in the succeeding layer, wherein the grid router comprises a hashing unit for using a hashing function to direct incoming packets through the layers, and wherein the hashing function is configured to reinforce the segregation by directing packets arriving at a given unit in one layer only to units of a corresponding subset in the succeeding layer.

In an embodiment, the hashing function is a uniform function pointing to location tables, the location tables being specific to respective subsets.

In an embodiment, the hashing function comprises a plurality of hashing sub-functions, each sub-function being specific to a given subset.

In an embodiment, the hashing sub-functions are variants of a single hash function.

In an embodiment, the hashing function is a single hash function and is fed a key that is offset by an identifier implying a given subset.

In an embodiment, the hashing function comprises grouped sub-functions, each grouped sub-function being set with a bias for a physically closest unit of a respective subset.

The network may be a broadband access network, a PON based broadband access network, a wireless access network or an IMS network or any other kind of electronic network.

In an embodiment, external units are respectively connected via an aggregated link to a first and at least a second access point of the network, wherein the network is constructed such that notification of a failure of a unit in one layer of the network is passed on to a corresponding access point, thereby allowing traffic from a given external unit to be rerouted to at least one second access point via the aggregated link, thereby to avoid the failure.

In an embodiment, packets are hashed to a primary and a secondary member of a pair of parallel units, such that in the event of failure of the primary member, a respective packet is routed to the secondary member, thereby avoiding the failure.

In an embodiment, the access points are ingress units, the unit in one layer to which said failure notification relates is a mailbox unit, and the notification of failure causes shutting down of said corresponding access point interface, thereby to cause traffic to be rerouted to another ingress point participating in the same aggregated link.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
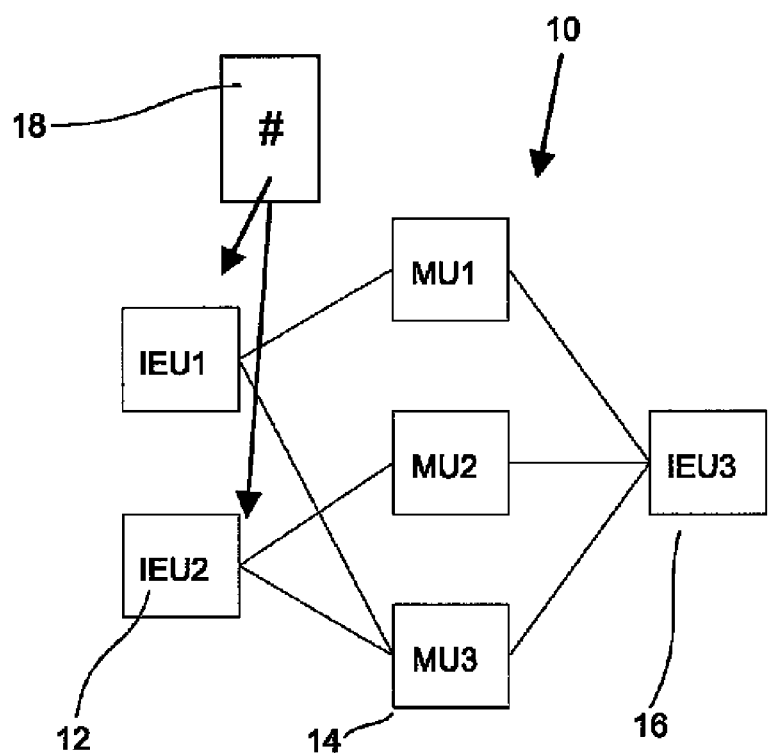
FIG. 1 is a simplified diagram illustrating a grid router device according to a first embodiment of the present invention.

The present embodiments comprise a grid router or network supported by grid routers, where the network is segregated.

In general grid routers are not used on segregated networks and forwarding may use destination based look up tables. The problem with destination based look up tables is that they need to be modified with every new destination and thus the solution is not scalable.

Grid routers as in the prior art provide a scalable solution but would not be suitable for forwarding in a segregated network since they use hashing functions for forwarding which are uniform functions and therefore do not support segregation.

The present embodiments provide a way to use grid routers in a segregated network by modifying the hash function in order to support segregation. Thus a solution is provided for segregated networks which may be scalable.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

FIG. 1 illustrates a segregated network according to an embodiment of the present invention. The network of FIG. 1 is considered segregated because IEU1 is not connected to MU2 and IEU2 is not connected to MU1. All other possible connections between IEU's and MU's exist in this example. In such a network, IEU1 (as IU) forwarding traffic towards IEU3 (as EU) must limit such forwarding to a subset of the MU's, MU1 and MU3 in this example, which in turn are connected to the required target IEU3.

The units of the segregated network of FIG. 1 use hash functions to forward packets over the network.

As a result of network segregation, the hash function that is used by an IEU, for example IEU1 in FIG. 1, is required to forward a packet to a target IEU, for example IEU3. The hash function must be such that the MU's selected by it are limited to the subset of MU's connected to a target IEU and to the source IEU, thus MU1, MU2 and MU3 are all connected to target IEU3 but only MU1 and MU3 are connected to IEU1, so the hash function must be one that never points to MU2. The hash function can thus no longer be a function that uniformly selects MU's from the set of all MU's. In other words, the hash function should select MU's from a subset of MU's that are connected to both the source and the target IEUs.

Now considered in more detail, a grid router such as grid router 10 shown in FIG. 1, routes packets. The router comprises ingress units (IE), mail units (MU), and egress units (EU) connected in a structure of three succeeding layers, layer 12, layer 14 and layer 16 as shown. The layered structure is segregated so that units in a given layer are connected only to a subset of units in a succeeding layer—thus IEU1 is connected only to MU1 and MU3, but not MU2. The subset made up of MU1 and MU3 is an incomplete subset of layer 14. The grid router comprises a hashing unit 18 which uses a hashing function to direct incoming packets through the layers, and the hashing function reinforces the segregation by directing packets arriving at a given unit in one layer so that they are sent only to units of the corresponding subset in the succeeding layer. Thus packets arriving at IEU1 would only be directed by hashing to MU1 or MU3 and not to the unavailable MU2.

The hashing function may be a uniform function but pointing to location tables instead of to actual units. The location tables may be specific to respective subsets. Thus IEU1 and IEU2 may both use the same uniform hashing function but each points to a table, and the table in IEU1 contains MU1 and MU3, whereas the table in IEU2 includes MU2 and MU3. This implies that any given mailbox should only be located on an MU that is connected to all the IUs that may potentially send packets to it.

In an alternative embodiment, the hashing function comprises different hashing sub-functions, each sub-function being specific to a given subset. In this case IEU1 and IEU2 have different hashing sub-functions.

The different hashing sub-functions may in fact be variants of the same hash function.

As a further alternative, a single hash function may be fed a key that is offset by an identifier implying the unique MU subset. Thus IEU1 and IEU2 may both use the same hash function but IEU1 may be fed a key that gives it an offset to point to MU1 or MU3 and IEU2 is fed a different key that offsets it to point to MU2 or MU3.

The hashing function may comprise grouped sub-functions, each grouped sub-function being set with a bias for a physically closest unit of a subset. Thus, as mentioned, IEU2 includes both MU1 and MU3 in its subset. However MU1 may be physically closer, so the function may be biased to send most traffic to MU1 and thus save on congestion.

The sub-sets may be selected differentially depending on the traffic flow to which the packet belongs, so as to provide best routing or a single point of control for the flow. In the case of traffic arriving from multiple IUs to a single destination, a way of controlling the traffic flow would be to designate an MU connected to the destination EU. By contrast, multicast traffic may be forwarded to an MU collocated with the IU receiving the multicast traffic. It is noted that such collocation may involve the MU and the IU being located on the same server such that forwarding between the MU and the IU has no network cost. Traffic flowing upstream may be routed to an MU collocated with the destination EU of said traffic. Traffic flowing downstream by contrast is best forwarded to an MU collocated with the source IU of said traffic. For traffic requiring multi-hop forwarding, the traffic may be forwarded to an MU collocated with the source IU of the traffic. The MU to which the data is forwarded may then forward the traffic to the next hop.

Multi-hop forwarding is now briefly described. Multi-hop forwarding may include such cases as wherein traffic that exits the grid router is handled by an external network element, is returned to the grid router and forwarded on to the next network element etc. For such traffic, packets may be sent to the MU collocated with the source IU since it is the only MU that may be connected to the source IU.

The embodiments are now considered in greater detail. A grid router is a distributed system consisting of the following main data flow elements:

1. Ingress Units (IU)—responsible for receiving packets from the external interfaces, parsing them and forwarding them based on a decision algorithm to the MU's.
2. Mailbox Units (MU)—responsible for storing the packets in queues, also referred to herein simply as mailboxes, scheduling their transmission and forwarding them at the appropriate time to the EU's.
3. Egress Units (EU)—responsible for storing the packets in egress queues, scheduling their transmission and finally forwarding them at the appropriate time to the external interfaces of the system.

The IU and EU are connected to external interfaces of the system and are typically paired to form an Ingress-Egress Unit (IEU) or External Interface Unit (IEU). Both terms are considered equivalent.

The details of ingress-egress data flow are described in prior art and in particular in USPTO application Ser. Nos. 11/615,977, 11/927,861 and 12/195,490 all assigned to ConteXtream, and the contents of which are hereby incorporated by reference.

Figure 2:
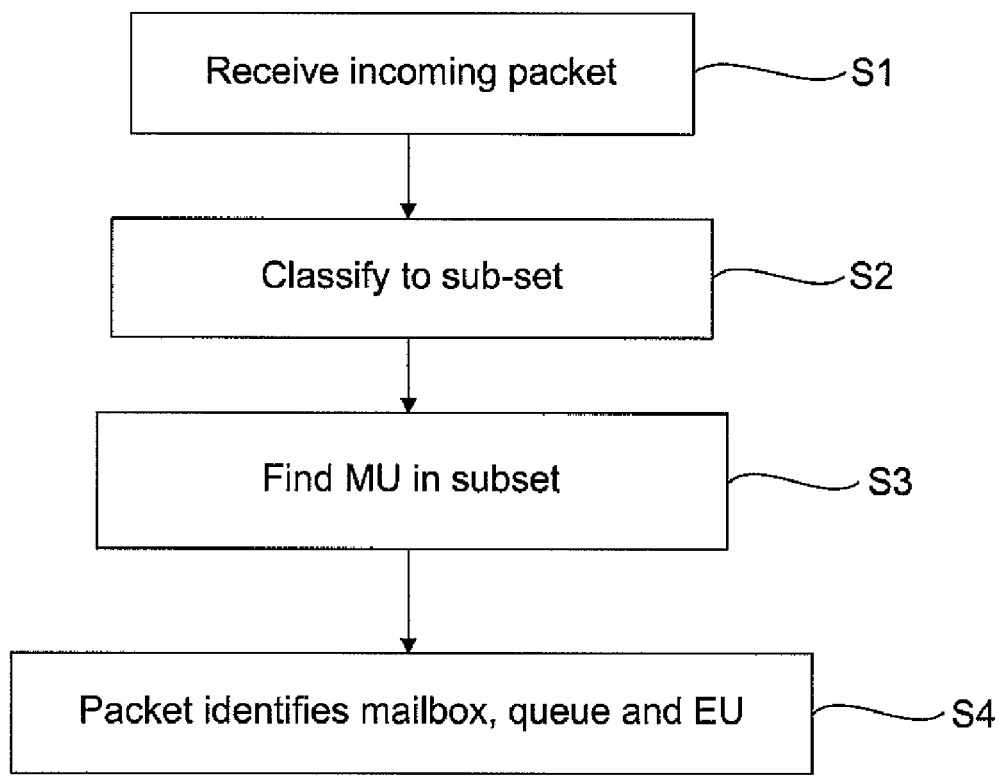
FIG. 2 is a simplified flow diagram showing operation of a grid router according to an embodiment of the present invention.

Reference is now made to FIG. 2 which is a flow chart showing a modification of the data flow according a process of the present embodiments.

The following are steps of the data flow:

1. An incoming packet is received at the IU.
2. Following packet reception, the IU classifies the packet based on predefined classification rules to a given administrative domain or sub-set. This selection is based on a hash function applied to the domain ID and the required packet headers, and according to the present embodiments is constrained to segregation on the network.
3. Based on the administrative domain or sub-set and certain packet headers, for example the IP destination address, the IU selects a target MU.
4. Once the packet arrives at the selected MU, a target mailbox of the packet may be identified based on packet headers as well as initial classification results. The mailbox identified implies a queue that the packet needs to be inserted into and further defines the destination EU to which the packet is to be sent from the mailbox as well as scheduling related parameters such as assured rate, maximum rate and class of service.

In many cases, due to the need to preserve resources, one IU, one EU and one MU entity may be located on a single physical entity such as a server. In these cases, communications between these nodes, and in particular between the IU and the MU, may be performed via an Inter-Process Communications (IPC) mechanism such as shared memory. Such means of communications may be beneficial in terms of processing overhead since it requires lighter processing than a typical transport protocol used between nodes connected over a network. In addition, reducing network hop counts by keeping a packet within a server for its first hop reduces the network overhead.

Following the classification of an incoming packet at the IU, the IU selects an MU to which to forward the packet. The MU may be selected based on a simple hash function on the results of classification and certain fields in the packet header, typically the destination address of the packet. Under the assumption of uniform address distribution as per the prior art, the result of the hash evenly spreads out traffic over all potential next-hop MU's. This is a welcome feature since it ensures the scalability of the Grid Router. However, uniform hashing does not support a segregated network.

An enhancement of the above hash-based forwarding concept for the case of the segregated network may comprise limiting the potential target MU's to a subset of MU's. This limitation may be required in order to enforce administrative network segregation, or due to a network topology that lacks full connectivity from all MU's to all EU's. In both cases, a common mechanism may be used to enforce MU segregation. Instead of using a single hash function for all incoming packets, a unique hash function may be used per administrative domain, per packet destination or per any other equivalence class of packets that may require targeting a unique subset of MU's.

The use of multiple hash functions may be implemented in several ways. The following list of embodiments is merely exemplary. A first embodiment uses a single hash function which points to multiple hash tables each dedicated to a subset of MU's.

A second embodiment uses a single hash function which is fed a key that is offset by an identifier implying the unique MU subset.

A third embodiment uses variants of a certain hash function for each MU subset. Many other techniques known in the art may also be used for this hash function segregation.

The present embodiments may thus make use of different hash functions, or hash functions with different lookup tables or hash functions with offsets, in order to control traffic flow over network topologies where there is limited connectivity between MU's and EU's.

There are several factors that need to be taken into account when configuring a Grid Router to forward packets from an IU to an MU. Some of these factors are described hereinbelow.

In many cases, and in particular in the case of multicast traffic, it makes sense to forward packets from an IU to the MU closest to it. This may reduce the load on the network by allowing the MU, which may be aware of the EU's requiring a multicast packet, to make intelligent use of underlying transport network multicast capabilities, a task that may not be possible at the IU due to its lack of knowledge regarding the EU's requiring the packet.

In another case, where the IU is collocated with one or more MUs on the same server, the overhead of forwarding packets over the network to such MU's may be eliminated altogether. Hence, collocated or nearby MU's may be preferred over more distant MU's.

In the case mentioned above, where an IU is collocated with one or more MU's on the same server, in addition to the network efficiency achieved by forwarding to such servers, this may also reduce processing overheads. This is due to the reduced complexity of communications between processes residing on the same servers, or even the same operating system, versus the overhead associated with network protocols required for the transmission of packets over a network.

If the transport network is segregated in such a way that certain EU's are only reachable by a subset of MU's, packets destined for sending to such EU's must only be forwarded to such MU's. This phenomenon is typical for MU's which are collocated with certain EU's but cannot forward packets to other EU's.

A traffic flow may be defined for example for all packets sent to a certain network service subscriber. One of the concepts of Grid Routers as described in the art is that despite the distribution of packets over multiple MU's based on a hash function, each traffic flow in the network is still handled by a single point of control, a single MU, which may measure, queue and shape traffic transmission towards its destination. When traffic is anticipated to arrive from multiple sources to a single destination, centralized control cannot take place on an MU collocated with such sources since there are multiple such MU's. On the other hand, when a traffic flow arrives from a single source, it may be handled by any MU in the network, and in particular by an MU close to the source, without jeopardizing the ability to control the traffic flow at a single point of control. A typical example of traffic flowing from multiple sources to a single destination is upstream traffic from broadband access, VoIP, VoD or IPTV subscribers towards a server providing such services. On the other hand, traffic flows towards such subscribers typically come from a single source, at least within a given timeframe.

Based on the considerations above the following describes methodologies for MU subset selections:
1. Multicast traffic is preferably forwarded to an MU collocated with the IU receiving such traffic. This enhances network and processing efficiency.
2. Upstream traffic is preferably forwarded to an MU collocated with the destination EU of such traffic. This ensures a single point of control of the traffic which may then typically be sent over uncongested traffic paths.
3. Downstream traffic is preferably forwarded to an MU collocated with the source IU of such traffic. This enhances network and processing efficiency.
4. Traffic that requires multi-hop forwarding is preferably forwarded to an MU collocated with the source IU of such traffic. Such an MU may be configured to forward such traffic to its next hop and it may be the only MU connected to the IU anyway.

A requirement of any telecom grade system is its high availability. For the Grid Router as described in the above referred to art, high MU availability may be achieved by pairing MU's and allowing the hash function used for MU selection to select a pair of MU's of which one is selected based on their availability.

In the present context, in cases where a single MU is selected, typically an MU collocated with the IU forwarding packets, the above high availability concept is no longer relevant. In such cases, high Grid Router availability may be ensured by a higher aggregate high availability concept. For instance, when an IU is collocated with an MU, it may also fail simultaneously with the MU. A paired IU and MU may be protected by another paired IU and MU, both pairs connected to external entities by means of a shared highly available connection such as an aggregation of Ethernet links. Such an aggregation is known as LAG or as defined in the art as IEEE Std 802.3 ad-2000. In such a configuration, the failure of one MU can be mitigated by the existence of a second MU while each such MU is a single target for packets coming from each of the two IU's. This keeps the Grid Router highly available due to the fact that when an MU fails all potential sources of packets sent to it either also fail, namely the collocated IU, or they are able to divert their traffic to a redundant MU, for example by hashing to pairs of MU's as described above.

Figure 3:
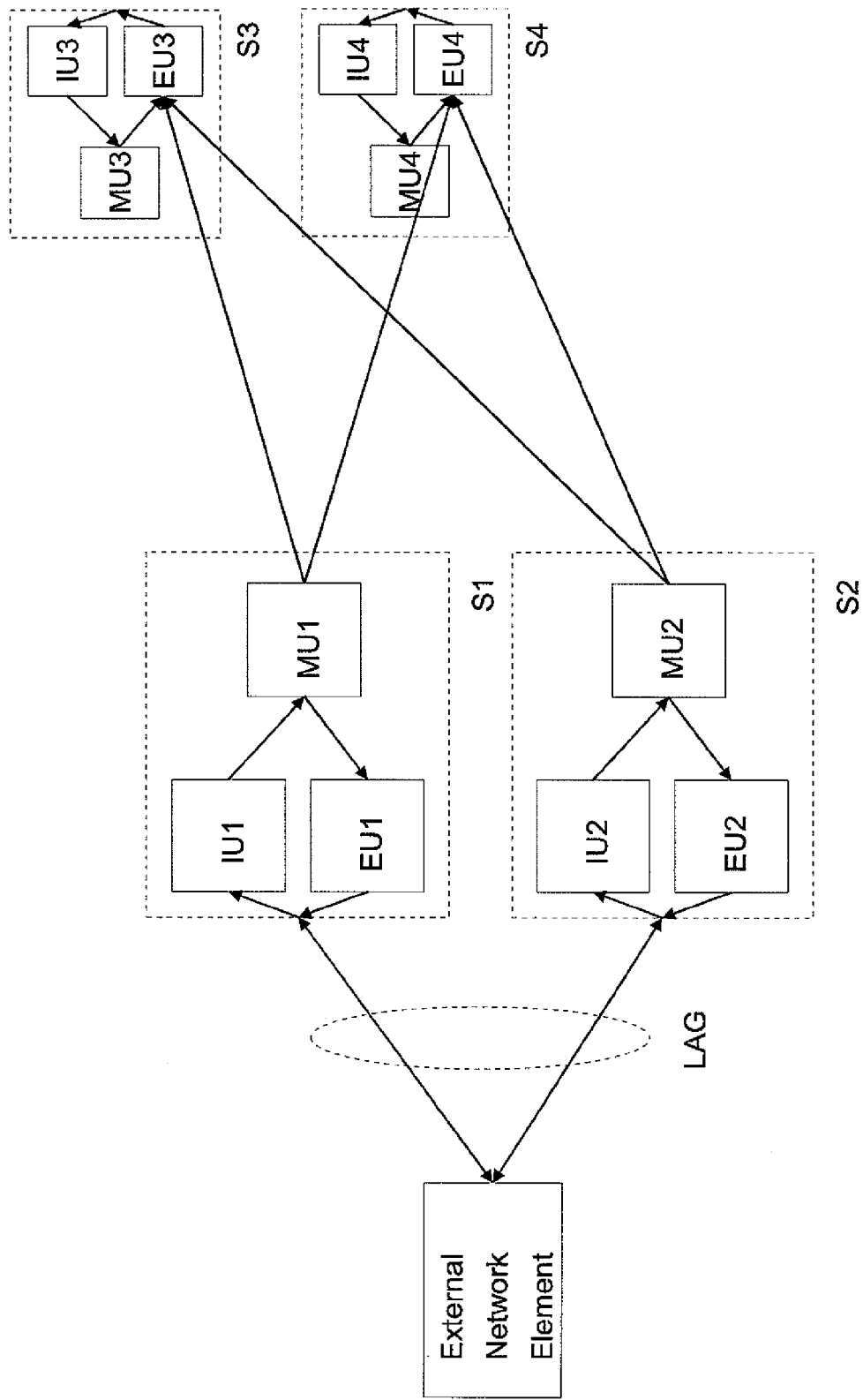
FIG. 3 is a simplified diagram showing a modification of the grid router of FIG. 1 to provide high availability.

FIG. 3 is a simplified block diagram which depicts such a configuration including redundancy. In this figure IU1, EU1 and MU1 are collocated on a single server S1. Likewise IU2, EU2 and MU2 are collocated on a single server S2. Both servers are connected to an external network element via an aggregated link marked "LAG". In the event of a failure of MU1, IU1 and EU1 are designed to fail as well causing the external link of S1 within the LAG to fail. As a result, traffic from the external entity is forwarded only to S2 which serves in this case as a hot standby to all entities in S1. Note that traffic destined to MU1 from other IU's in the network, such as IU3 and IU4 may be diverted by them to MU2 by means of a hash function that selects pairs of MU's, and in this case the pair (MU1, MU2). Once IU3 (or IU4) detects that MU1 has failed (via an internal Grid Router protocol or heartbeat) it may direct packets to MU2 (the secondary MU within the pair selected by the hash function it uses for such packets).

The above may be viewed as two separate systems for failure protection, as follows:
1. MU protection by means of selecting MU pairs by the hash function and forwarding packets to a preferred MU within the pair unless it is dysfunctional, in which case the packets are forwarded to the remaining functional MU.
2. MU protection by means of failing an IU collocated with the MU and further failing the interfaces connected to such an IU in case of failure of the MU. If the failed interfaces participate in Link Aggregation, this ensures that external entities connected to the Grid Router via these interfaces, refrain from forwarding packets to the failed IU's and hence will only forward packets to IU's that are still connected to functional MU's.

Example of Application to a Regional Access Network

Figure 4:
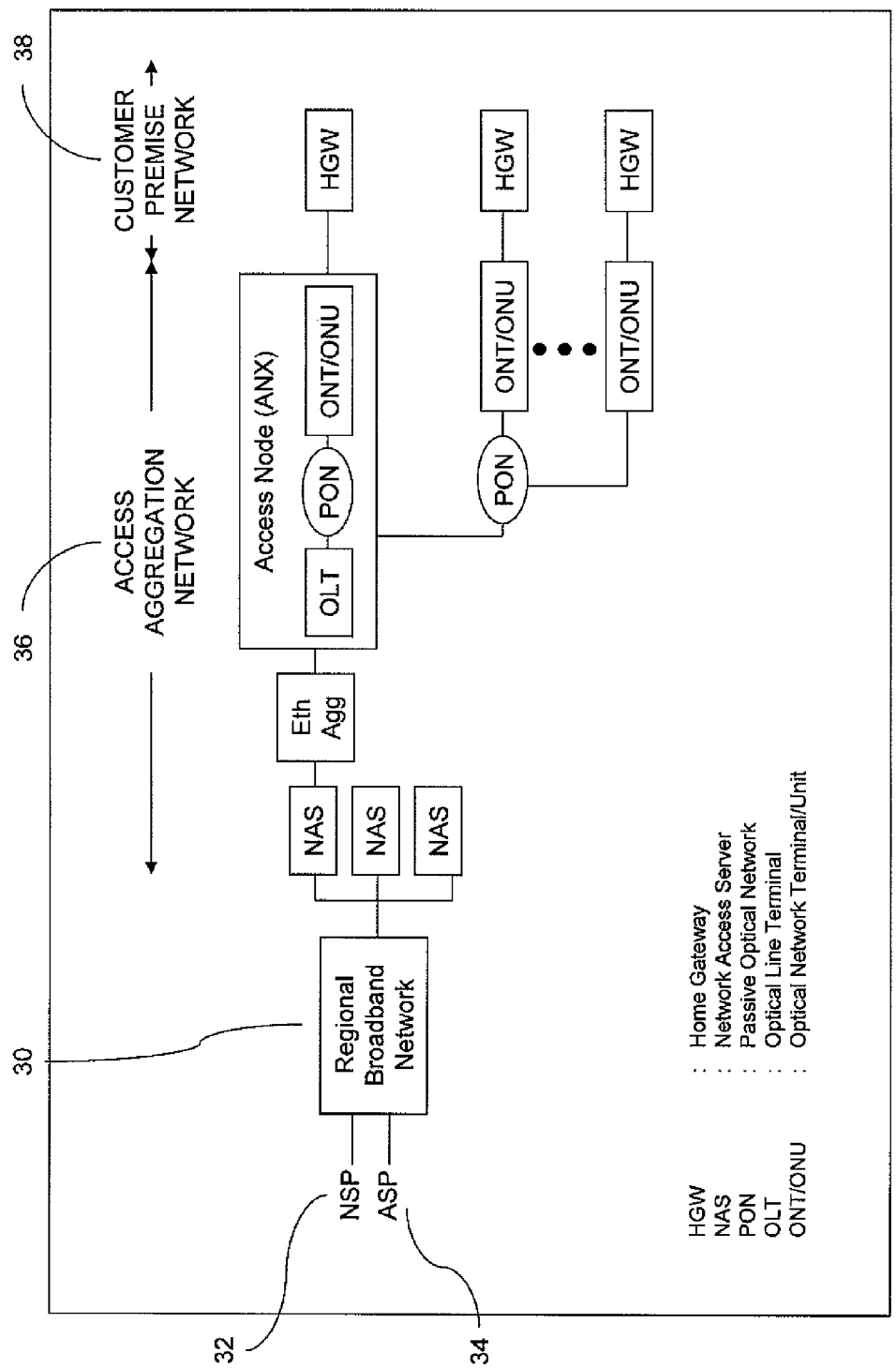
FIG. 4 shows an exemplary segregated network using a grid router according to the present embodiments.

An example network of interest in the context of the above described concepts is a regional broadband access network based on a Passive Optical Network (PON). In FIG. 4, a carrier network is depicted where a Regional Broadband Network 30 connects Network Service Providers (NSP) and Application Service Providers (ASP) to an access aggregation network 36 eventually reaching residential subscribers 38 of services including TV, Video on Demand (VoD), Voice and Internet services (commonly referred to in the art as "Triple Play" services). FIG. 4 is taken from the IETF draft document known as draft-bitar-wadhwa-ancp-pon-01 written by Nabil Bitar of Verizon and Sanjay Wadhwa of Juniper Networks.

In the present context, a grid router would typically span the Regional Broadband Network such that Grid Router nodes would be positioned near NSP and ASP network elements such as routers, video servers or voice gateways, as well as at the position of the Network Access Servers (NAS) as defined by the Access Node Control Protocol (ANCP) where they perform the NAS functionality.

The Regional Broadband Network as depicted in FIG. 4, is a classic example of a segregated network acting as a transport network as referred to in the sections above, especially where the ASP's 34 and NSP's 32 are not allowed to communicate directly due to network and administrative segregation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A grid router for routing packets, the router comprising ingress circuits (IUs), mailbox circuits (MUs), and egress circuits (EUs) connected in a structure of succeeding layers, said layered structure being segregated such that circuits in a given layer are connected only to a corresponding subset of mailbox circuits in a succeeding layer, said corresponding subset of mailbox circuits being an incomplete subset of mailbox circuits in said succeeding layer, said segregation excluding packet flows not between said circuits in the given layer and said corresponding subset of mailbox circuits,
wherein said grid router further comprises a hashing circuit for using a hashing function to direct incoming packets through said layers, and wherein said hashing function is configured to reinforce said segregation by directing the packets arriving at a given circuit in one layer to the circuits only of the corresponding subset in said succeeding layer, to which the circuits of said corresponding subset, flow is allowed by said segregation.

2. The grid router of claim 1, wherein said hashing function is a uniform function pointing to location tables, said location tables being specific to respective subsets.

3. The grid router of claim 1, wherein said hashing function comprises a plurality of hashing sub-functions, each sub-function being specific to a given subset.

4. The grid router of claim 3, wherein said hashing sub-functions are variants of a single hash function.

5. The grid router of claim 1, wherein said hashing function is a single hash function and is fed a key that is offset by an identifier implying a given subset.

6. The grid router of claim 1, wherein said hashing function comprises grouped sub-functions, each grouped sub-function being set with a bias for a physically closest unit of a respective subset.

7. The grid router of claim 1, wherein for multicast traffic, selection of a subset comprises forwarding to a mailbox circuit (MU) collocated with an ingress circuit (IU) receiving said multicast traffic.

8. The grid router of claim 1, wherein for traffic flowing upstream towards an application service source, selection of a subset comprises forwarding said traffic to a mailbox circuit (MU) collocated with a destination egress circuit (EU) of said traffic.

9. The grid router of claim 1, wherein for traffic flowing downstream from an application service source, selection of a subset comprises forwarding said traffic to a mailbox circuit (MU) collocated with a source ingress circuit (IU) of said traffic.

10. The grid router of claim 1, wherein for traffic requiring multi-hop forwarding, selection of a subset comprises forwarding said traffic to a mailbox circuit (MU) collocated with a source ingress circuit (IU) of said traffic, said collocated MU further being configurable to forward said traffic to a next one of multi-hops.

11. The grid router of claim 1, wherein external circuits are respectively connected via an aggregated link to a first and at least a second access point of said grid router, wherein said grid router is constructed such that notification of a failure of a particular circuit in particular layer of said grid router is passed on to a corresponding access point, thereby allowing traffic from a given external circuit to be rerouted to at least one said second access point via said aggregated link, thereby to avoid said failure.

12. The grid router of claim 11, wherein said access points are the ingress circuits, said particular circuit in the particular layer to which said failure notification relates is a mailbox circuit, and said notification of failure causes shutting down of corresponding access point interface, thereby to cause the traffic to be rerouted to another ingress point participating in said aggregated link.

13. The grid router of claim 1, wherein the packets are hashed to a primary and a secondary member of a pair of parallel circuits, such that in the event of failure of said primary member, a respective packet is routed to said secondary member, thereby avoiding said failure.

14. A network system comprising grid routers for routing packets,
each of the grid routers comprising ingress circuits (IUs), mailbox circuits (MUs), and egress circuits (EUs) connected in a structure of succeeding layers, said layered structure being segregated such that circuits in a given layer are connected only to a corresponding subset of mailbox circuits in a succeeding layer, said corresponding subset of mailbox circuits being an incomplete subset of mailbox circuits in said succeeding layer, said segregation excluding packet flows not between said circuits in the given layer and said corresponding subset of mailbox circuits,
wherein each of said grid routers further comprises a hashing circuit for using a hashing function to direct incoming packets through said layers, and wherein said hashing function is configured to reinforce said segregation by directing the packets arriving at a given circuit in one layer to the circuits only of the corresponding subset in said succeeding layer, to which the circuits of said corresponding subset, flow is allowed by said segregation.

15. A network system of claim 14, wherein said hashing function is a uniform function pointing to location tables, said location tables being specific to respective subsets.

16. The network system of claim 14, wherein said hashing function comprises a plurality of hashing sub-functions, each sub-function being specific to a given subset.

17. The network system of claim 16, wherein said hashing sub-functions are variants of a single hash function.

18. The network system of claim 14, wherein said hashing function is a single hash function and is fed a key that is offset by an identifier implying a given subset.

19. The network system of claim 14, wherein said hashing function comprises grouped sub-functions, each grouped sub-function being set with a bias for a physically closest unit of a respective subset.

20. The network system of claim 14, being one member of the group comprising, a broadband access network, a PON based broadband access network, a wireless access network and an IMS network.

21. The network system of claim 14, wherein external circuits are respectively connected via an aggregated link to a first and at least a second access point of said network system, wherein said network system is constructed such that notification of a failure of a particular circuit in particular layer of said network system is passed on to a corresponding access point, thereby allowing traffic from a given external circuit to be rerouted to at least one said second access point via said aggregated link, thereby to avoid said failure.

22. The network system of claim 21, wherein said access points are the ingress circuits, said particular circuit in the particular layer to which said failure notification relates is a mailbox circuit, and said notification of failure causes shutting down of corresponding access point interface, thereby to cause the traffic to be rerouted to another ingress point participating in said aggregated link.

23. The network system of claim 14, wherein the packets are hashed to a primary and a secondary member of a pair of parallel circuits, such that in the event of failure of said primary member, a respective packet is routed to said secondary member, thereby avoiding said failure.

* * * * *